United States Patent [19]

Meyer

[11] Patent Number: 4,627,563

[45] Date of Patent: Dec. 9, 1986

[54] DEVICE FOR DRIVING U-SHAPED ANCHORS INTO THE GROUND

[76] Inventor: Dennis W. Meyer, 635 Julie St., Willmar, Minn. 56201

[21] Appl. No.: 767,785

[22] Filed: Aug. 20, 1985

[51] Int. Cl.$^4$ .......................... B25C 5/06; B25C 5/13
[52] U.S. Cl. .................................... 227/130; 227/120; 227/147; 227/156
[58] Field of Search ................ 227/120, 130, 142, 156

[56] References Cited

U.S. PATENT DOCUMENTS

| | | | |
|---|---|---|---|
| 212,861 | 3/1879 | Mower | 227/147 |
| 2,799,858 | 7/1957 | Bacon et al. | 227/147 |
| 3,157,884 | 11/1964 | Decot et al. | 227/130 X |
| 3,272,267 | 9/1966 | Langas | 227/156 |
| 3,930,604 | 1/1976 | Pitkin, Jr. et al. | 227/130 X |
| 4,030,654 | 6/1977 | York | 227/147 X |
| 4,500,025 | 2/1985 | Skwor | 227/156 X |

Primary Examiner—Paul A. Bell
Attorney, Agent, or Firm—Peterson, Wicks, Nemer & Kamrath

[57] ABSTRACT

Various sheet-like materials require fastening to the ground. Included in such materials is a blanket comprised of netting and excelsior. A device for driving U-shaped anchors downwardly so as to secure the blanket to the ground at selected locations comprises a shoe having a sole plate that is adapted to engage the netting or other upper surface of whatever sheet-like material is to be anchored. The sole plate has a transverse slot through which a plunger is moved downwardly when a U-shaped anchor has been advanced into alignment beneath the plunger. The plunger is carried at the lower end of a reciprocable piston rod which has a piston at its upper end. By means of a foot-operable valve, compressed air is introduced into the upper end of the cylinder, thereby forcing the piston, the piston rod and the plunger downwardly so as to force an anchor into the ground. The downward movement of the plunger is limited by means of a stop that is struck by a collar attached to the lower end of the piston rod. The device is portable and can be readily transported from site to site in the anchoring of sheet-like material which can include sod and various flexible plastic sheets.

12 Claims, 6 Drawing Figures

U.S. Patent   Dec. 9, 1986   Sheet 1 of 2   4,627,563
Fig. 1
Fig. 2
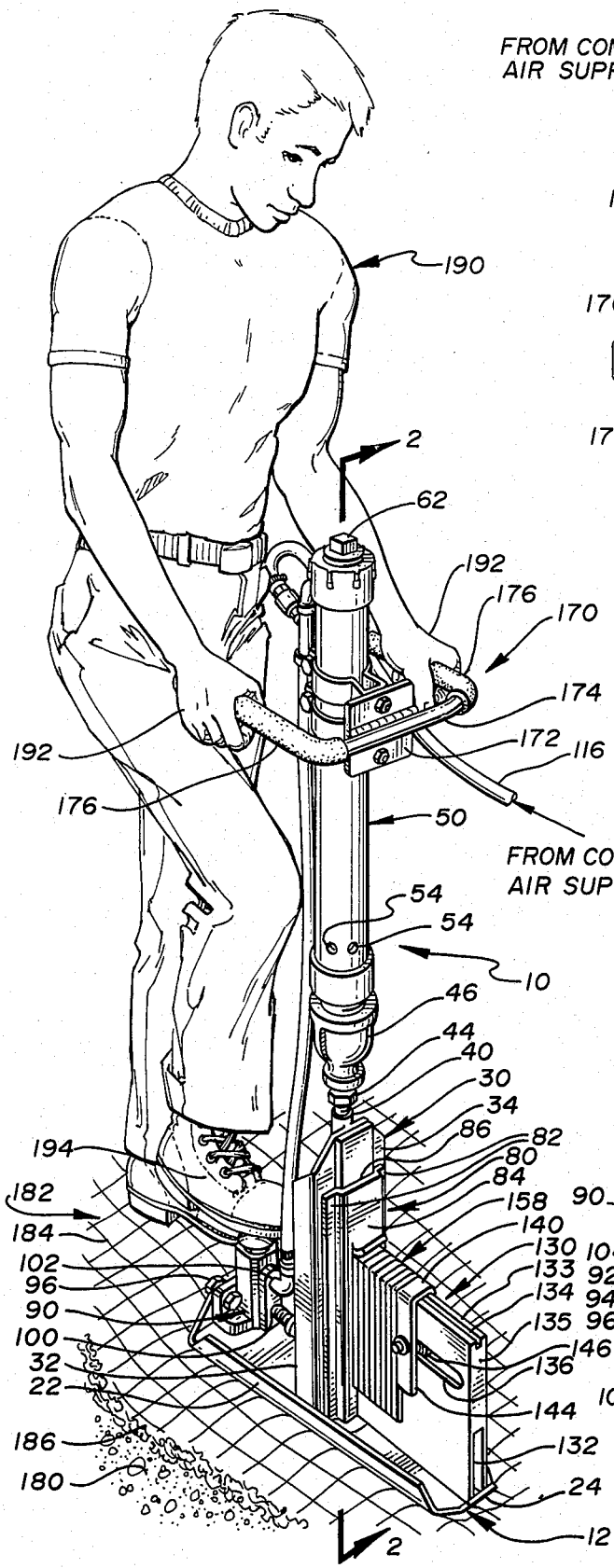
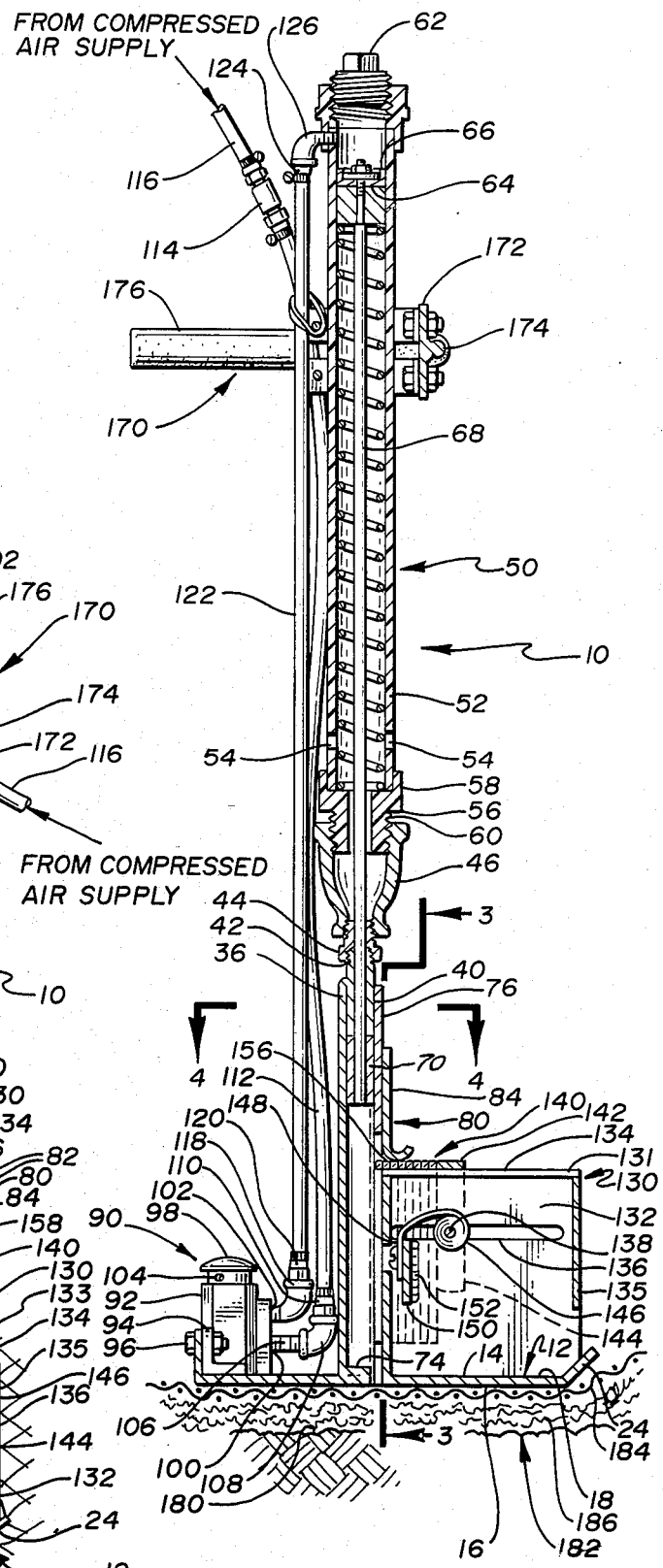

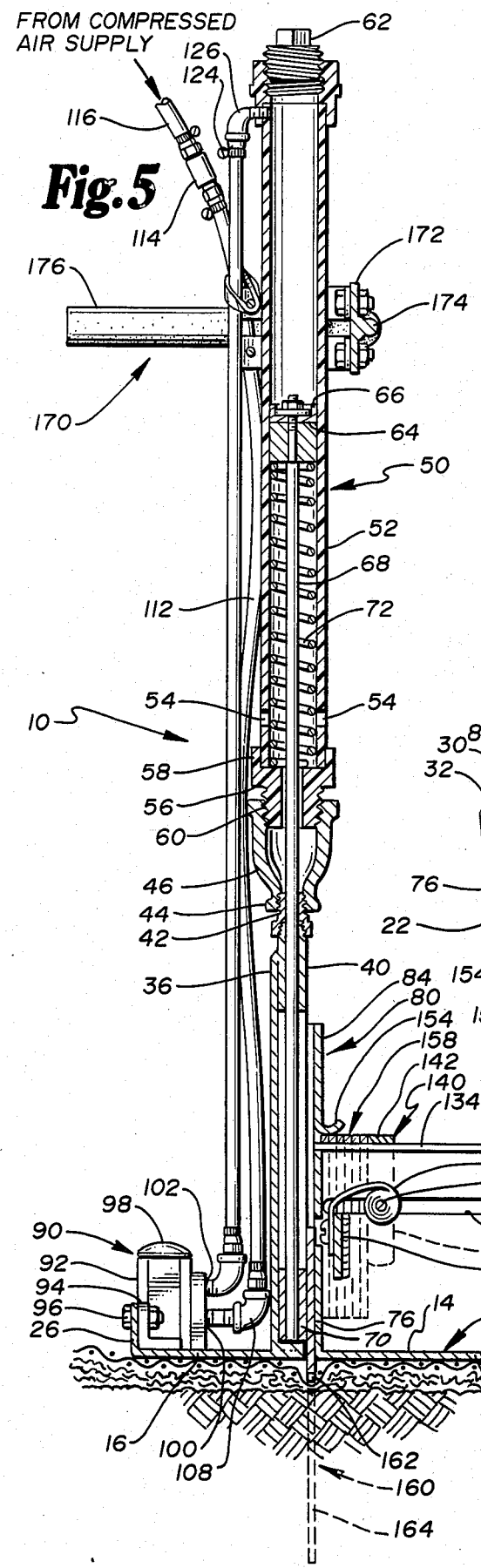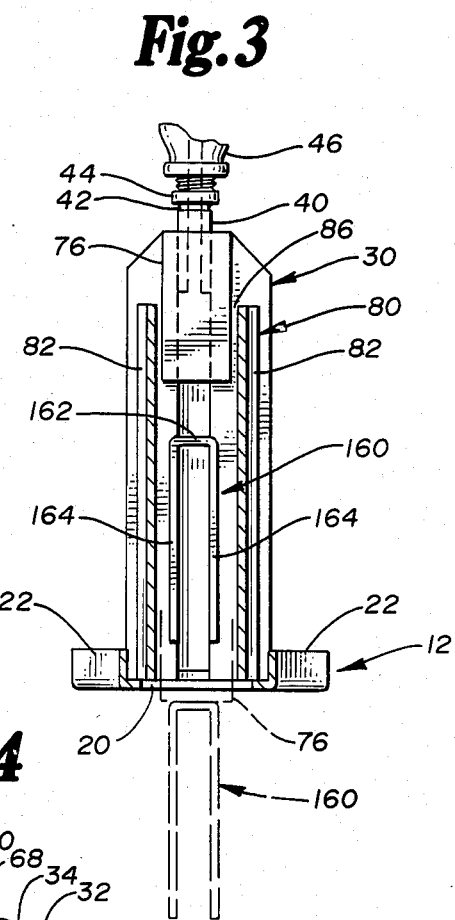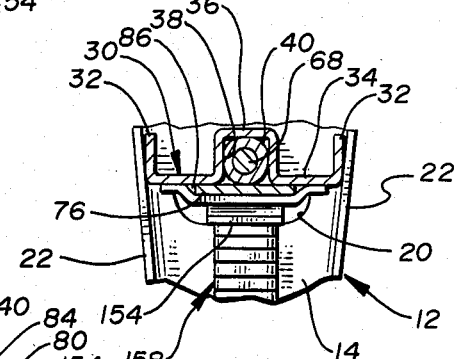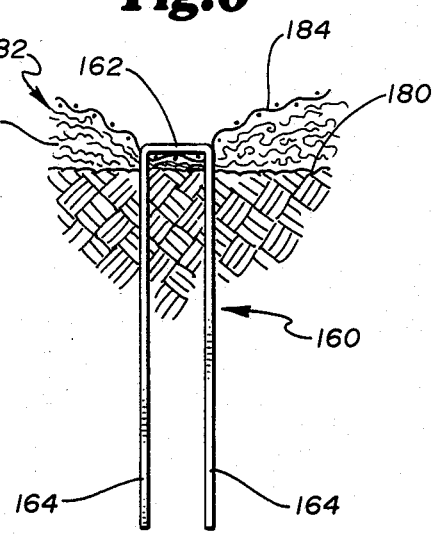

DEVICE FOR DRIVING U-SHAPED ANCHORS INTO THE GROUND

BACKGROUND OF THE INVENTION

1. Field of the Invention

This invention relates to a portable device for driving U-shaped anchors into the ground in order to hold in place various types of sheet-like material.

2. Description of the Prior Art

Nurseries for many years have planted grass seed over relatively large areas in order to provide a source of sod. Recently, however, it has become quite common to plant grass seed along highways where the terrain not only slopes but where the profile is irregular. The seedling grass usually requires a considerable amount of care, care that usually makes use of a protective covering. The protective covering most used is what is best termed a blanket or mat comprised of netting and underlying excelsior, the blankets being supplied in the form of rolls that are placed over the newly seeded grass areas, or, in some cases where grass seedlings have already sprouted.

In order to hold the netting and underlying excelsior in place, U-shaped anchors have been manually driven into the ground with a conventional hammer or mallet. Obviously, where large areas are to be covered with such a blanket, the manual process becomes quite tedious and time consuming, as well as costly because of the large amount of labor that is required.

As far as I am aware, no machine has been devised for inserting U-shaped anchors into the ground in order to maintain the netting and excelsior blankets in place. However, straight rigid rods, while not U-shaped, have been used as anchors, and a machine for doing this automatically is described in U.S. Pat. No. 4,410,050, granted Oct. 18, 1983 to Councell, Jr. et al. for "Machine for Inserting Rigid Members in the Soil." This machine is especially designed to drive straight tubes in the ground, doing so intermittently and at spaced locations. However, the use of straight tubes is not as effective as U-shaped anchors in holding the netting and the underlying excelsior in place. Furthermore, the machine disclosed in the alluded to patent is quite complex, massive and costly. While satisfactory for use in a nursery operation, it is not readily transported from location to location, such as needed when anchoring blankets of netting and excelsior along highways.

Consequently, there remains a very real need for apparatus that will effectively and efficiently anchor blankets or mats composed of netting and excelsior to the ground in order to induce the growth of grass.

SUMMARY OF THE INVENTION

Accordingly, one important object of my invention is to provide a device or apparatus for effectively, efficiently and economically anchoring sheet-like material to the ground. While such sheet-like material will normally constitute a blanket or mat comprised of netting and excelsior, an aim of the invention is to permit sod to also be anchored, as well as plastic sheets in the form of a tarpaulin-type covering.

A more specific object of my invention is to drive U-shaped anchors into the ground so that the bight or closed end thereof will span a predetermined portion of the sheet-like material, the legs of the U-shaped anchor penetrating sufficiently into the ground so as to firmly retain in place the section of the sheet-like material that underlies the bight so that it will resist movement. Inasmuch as the material of the envisaged character, that is, netting and excelsior, comes in 4-foot width rolls, all that the worker need do is to drive U-shaped anchors at intervals along the margins of the unrolled blanket strips with an occasional anchor located between the edges and between the marginally located anchors. In this way, a relatively large field or area can be quickly covered and held covered when practicing my invention.

Another object of the invention is to provide a device that is portable, lightweight and which can be moved from one site to another very easily, and, of course, utilized at that site at various specific locations where the anchors will be of greatest utility and usefulness.

Yet another object of the invention is to provide a device of the foregoing character that can be pneumatically operated. In this regard, compressed air is usually available because compressors are usually employed by contractors for various purposes. The supply of compressed air enables the worker to simply step on a foot operated valve that admits air to the upper end of an air cylinder, driving the piston of the air cylinder downwardly, causing a plunger on the piston rod to strike a U-shaped anchor. The continued downward movement of the plunger drives the anchor into the ground.

It is also within the contemplation of my invention to take into account that various types of soil will differ widely in their degree of hardness and compactness. Some clay soils are quite compact and require more driving force for the anchor than when loose and sandy soils are encountered. My device, inasmuch as the worker's foot is utilized in the actuation of the air valve, resists any reactive movement of the device attributable to a hard soil condition in that the worker's weight is made use of.

Still further, an object of the invention is to provide a device that will not require any stooping of the worker. This has been a definite problem in the past where U-shaped anchors are hand-driven into the ground. The worker, when utilizing my device, stands erect and simply lifts or slides the device from the location where an anchor has just been inserted to another location, the use of an upturned forward edge on the sole plate, together with the presence of handle bars, enabling the worker to do this.

Another object of the invention is to provide a device for driving U-shaped anchors into the ground that will be relatively inexpensive to manufacture, thereby encouraging its widespread use for anchoring the various sheet-like materials within the contemplation of this invention, namely, blankets or mats composed of netting and underlying excelsior, sod, and plastic sheets or tarpaulins.

Still another object is to provide a device of the foregoing charcter that will have an automatic supply of U-shaped anchors, each anchor being successively fed or delivered into a registered relationship with a slot so that when the plunger is actuated downwardly it drives the anchor into the ground, the retraction of the plunger enabling the next anchor to be moved into juxtaposition beneath the plunger so that it can be driven downwardly on the next stroke of the plunger.

Briefly, my invention envisions a device having a generally channel-shaped shoe provided with a slotted sole plate. The bottom surface of the sole plate is adapted to be placed on the material to be anchored.

When so positioned, then the worker steps on the button of an air valve mounted on the channel-shaped shoe so that compressed air is introduced into the upper end of the air cylinder which forces the cylinder's piston and piston rod downwardly. A suitably shaped plunger is carried at the projecting end of the piston rod so that the plunger strikes the closed end of the foremost U-shaped anchor of a supply of such anchors. The downward force of the plunger pushes the anchor downwardly through the slot and thus anchors the material to the ground. When the worker releases his foot pressure, then the air within the cylinder is exhausted to atmosphere and the plunger is retracted by reason of a coil spring acting against the underside of the piston to return the piston to its uppermost position in preparation for inserting the next anchor into the ground. The U-shaped anchors are advanced one at a time into alignment with the plunger so that one is always availabe for the next anchoring step. The supply of anchors is simply replenished just before or immediately after the last one has been driven into the ground.

BRIEF DESCRIPTION OF THE DRAWINGS

FIG. 1 is a perspective view of a device exemplifying my invention and a worker who is about ready to drive a U-shaped anchor into the ground, a sheet-like material composed of netting and underlying excelsior also appearing in this view;

FIG. 2 is a vertical sectional view through the device of FIG. 1, the plunger being retracted into its upper position in readiness for driving an anchor into the ground;

FIG. 3 is a sectional detail taken in the direction of line 3—3 of FIG. 2, the U-shaped anchor that is shown in solid outline being prior to having been driven into the ground and the phantom outline position thereof after having been inserted;

FIG. 4 is a transverse sectional view taken in the directional of line 4—4 of FIG. 2 for the purpose of showing how the plunger is guided;

FIG. 5 is a sectional view corresponding to FIG. 2, but with the U-shaped anchor of FIG. 3 having been driven downwardly into the ground, and FIG. 6 is a sectional view through the netting, excelsior and a portion of the ground so as to demonstrate the U-shaped anchor after it has been fully inserted and is holding the netting and excelsior in place.

DESCRIPTION OF THE PREFERRED EMBODIMENT

Referring now to the drawings, a device exemplifying my invention has been denoted generally by the reference numeral 10. The device 10 comprises a channel-shaped shoe 12 having a sole plate 14 provided with a bottom surface 16 and an upper surface 18. Also, the sole plate 14 has formed therein a transverse slot 20. There are vertical side flanges 22 extending upwardly from the sole plate 14, a sloping front flange 24 and an upwardly directed rear flange 26. As the description progresses, it will be seen that the sloping front flange 24 facilitates the positioning of the entire device 10 at various desired locations where U-shaped anchors are to be driven into the ground.

The device 10 additionally includes a channel-shaped upright unit 30 having vertical side flanges 32, the lower portions of which flanges are welded to the side flanges 22 that extend upwardly from the sole plate 14. The channel-shaped upright 30 also includes a web 34 that is welded to the upper surface 18 of the sole plate 14. The web 34, while originally a flat plate, is formed so as to have a U-shaped central portion 36, thereby providing a groove labeled 38.

Although the upper end of a sleeve 40 can be seen in FIG. 1, the sleeve 40 is better viewed in FIGS. 2 and 5. The sleeve 40, as will become clearer hereinafter, functions as a tubular bearing. Therefore, it is welded to the sides of the U-shaped central portion 36 of the channel-shaped upright 30. The upper end of the sleeve 40 is formed with threads, as best seen in FIGS. 2 and 5. In this way, a bushing 44 can be threaded onto the end 42 of the sleeve 40. What constitutes a reducer-type pipe fitting has been given the reference numeral 46, and it will be perceived from FIGS. 2 and 5 that its larger end is uppermost, the lower end being threadedly engaged with the bushing 44.

Inasmuch as it is planned that U-shaped anchors be driven into the ground, although such anchors have not yet been identified, at this time attention is drawn to a ram-type air motor 50 which includes a vertical cylinder 52 having a series of exhaust ports 54 adjacent its lower end. The lower end also has a cup member 56 provided with an annular flange 58 that is welded to the lower end of the cylinder 52. The cup 56 has threads 60 at its lower end so as to be threadedly engageable with the upper threads of the previously mentioned fitting 46. Whereas the cup or cap 56 constitutes the open end of the ram-type air motor, the closed end is provided by an access plug 62.

Reciprocable within the cylinder 52 is a piston 64 having a flexible seal 66 associated therewith. A piston rod 68 extends downwardly from the piston 64, projecting downwardly through the cup or cap 56. The projecting end of the piston rod 68 has a collar 70 attached thereto. All that need be understood at this point is that the collar 70 moves downwardly and upwardly with the piston 64 and piston rod 68. There is a coil spring 72 held captive within the cylinder 52 so as to normally bias the piston 64, and also its rod 68, upwardly. It is due to the upward biasing supplied by the coil spring 72 that the upper end of the collar 70 abuts the lower end of the sleeve 40. It will be remembered that the sleeve 40 is welded within the sides of the U-shaped central portion 66 of the channel-shaped upright 30; this engagement can be seen in FIG. 2. Whereas the sleeve 40 limits the upward movement of the collar 70, the lower movement of the collar 70 is limited by a stop 74 fixedly mounted on the upper surface 18 of the sole plate 14, the stop 74 being located adjacent slot 20. It is important to keep in mind that the collar 70 is secured to one side of the lower end of the piston rod 68, such as by welding, and also that a plunger 76 in the form of a strip or plate is welded to the collar 70. In this way, the plunger 76 moves downwardly and upwardly with the piston 64 and the piston rod 68.

Attention is directed now to a guide plate 80 for the plunger 76. In other words, since the plunger 76 should be constrained for vertical reciprocation, it is the function of the guide plate 80 to achieve this. This is done by providing the guide plate with side flanges 82 that are welded to the web 34. However, the guide plate 80 has an offset web 84 which provides a slot 86 having dimensions corresponding generally to the dimensions or cross section of the plunger 76. Thus, as its name implies, the guide plate 80 guides the plunger 76 through its vertical path.

My device 10 makes use of a three-way valve 90 which includes a housing 92 having associated therewith an angle member 94. It is through this angle member 94 that a pair of bolts 96 extend, the bolts 96 also passing through the rear vertical flange 26 on the sole plate 14. In this way, the three-way valve 90 is fixedly secured to the channel-shaped shoe 12. It is important to note that the three-way valve 90 additionally includes a foot-engageable button 98. Before describing what happens when the button 98 is depressed, it is to be observed that the valve 90 has an in air inlet port at 100, an air outlet port at 102 and an exhaust air port at 104.

Connected directly to the inlet port 100 of the valve 90 is a short nipple 106 and connected to the nipple 106 is a 90° elbow 108. A plastic bushing 110 connects the elbow 108 to the lower end of a plastic tube or hose 112 that extends upwardly to a disconnect coupling 114. The coupling 114 connects with a plastic tube or hose 116 that leads to a compressed air supply (not shown). The plastic tube or hose 116 need only have a ¼ inch bore. Thus, the outer diameter of the tube or hose 116 is only on the order of ½ inch. Owing to the extreme lightweight of the tube or hose 116, indeterminate lengths can be utilized in order to reach an appropriate source of air under pressure. In this regard, usually contractors will have small air compressors that are readily available.

Continuing with the manner in which air is supplied to my device 10, it will be observed that there is a 90° street angle 118 that connects with the outlet port 102 of the valve 90. The upwardly facing end of the elbow 118 has a plastic bushing 120 so that connection is made to the lower end of a tube or hose 122. At the upper end of the tube or hose 122 is a plastic bushing 124 that connects with a 90° street elbow 126 that leads into the upper end of the cylinder 52.

For the purpose of reliably supplying U-shaped anchors to a position beneath the plunger 76 is a magazine indicated generally by the reference numeral 130. The magazine 130 includes a housing 131 comprised of laterally spaced vertical plates 132 having inturned upper edges 133 forming a slot 136 therebetween. Rigidity is imparted to the housing 131 by means of a transverse strip 135 secured to the right (as viewed in FIGS. 1, 2 and 5) edges of the plates 132.

It is of importance to observe that the two plates 132, which are laterally spaced, each have a horizontal slot 136. Movable within the slots 136 are end portions of a transverse shaft 138.

A U-shaped pusher 140 straddles the housing 131, the pusher 140 having a bight 142 and downwardly directed legs 134. The outwardly projecting ends of the shaft 138 are received or mounted in the downwardly directed legs 144 so that when the shaft 138 is moved to the left, as viewed in FIGS. 1, 2 and 5, then the pusher 140 is also advanced in the same direction.

The way in which the shaft 138 is advanced is by means of a flat spiral spring 146 that is coiled on the shaft 138. The end labled 148 of the spring 146 is attached to a transverse strip 150 by means of a screw 152, the transverse strip 150 simply extending between the left ends of the plates 132 of the housing 131. What the spiral spring 136 accomplishes is that it asserts a constant bias on the U-shaped pusher 140, urging the pusher 140 to the left.

Close inspection of FIGS. 1,3 and 5 will show that the guide plate 80, more specifically its offset web 84, has a curved lower tab or end 154 that forms a rectangular entrance or opening 156.

At this time attention is called to a supply of U-shaped anchors indicated generally by the reference numeral 158. The supply 158 includes a number of inverted U-shaped anchors 160, each having a bight 162 and downwardly extending legs 164. These anchors 160 can be fabricated from heavy wire stock, preferably from No. 9 to 11 gauge stock. The individual anchors 160 are adhered or bonded together to form the supply 158. However, the adherence or bonding is easily and successively broken when inserting a U-shaped anchor 160 into the ground.

Passing now to a brief description of the handle unit which has been assigned reference numeral 170, it is to be observed that the handle unit 170 is mounted adjacent the upper end of the cylinder 52 through the agency of a bracket 172. The handle unit 170 includes a U-shaped handle bar or rod 174 having resilient tubular hand grips 176 telescopically mounted thereon.

In order to appreciate the benefits to be derived from a practicing of my invention, it will be well to indicate a portion of the soil or ground by the reference numeral 180. As already indicated, my invention will find utility in anchoring various types of sheet material. However, there is an immediate need for a device, such as my device 10, for anchoring blankets or mats 182 comprised of a netting 184, usually having a ¾" mesh, and excelsior 186 adhered thereto. It is well known that excelsior 186 is composed of fine shavings that provide numerous air voids. Sheet material of this type is supplied in rolls having 4' widths. When unrolled, the blankets 182, which are in strip form, are marginally overlapped by about six inches and then anchored with my device 10.

To demonstrate how the anchoring procedure is accomplished, a worker 190 has been pictured in FIG. 1. The worker, when using my device 10, simply grasps the tubular grips 176. He then places his foot 194 on the button 98 of the three-way air valve 90. Of course, he first selects the particular location where an anchor 160 is to be driven into the ground 180.

Once having selected the particular location for an anchor 160, then the worker 190 depresses the button 98 with his foot 94. This causes air under pressure to flow from the source of compressed air (not shown) downwardly through the tube 112 which is connected to the tube 116. The air then enters the inlet port 100 and is discharged via the outlet port 102, passing upwardly through the tube 122 into the upper end of cylinder 52. This forces the piston 64 downwardly. Also, the collar 70, being mounted at the lower end of the piston rod 68, is urged downwardly. It will be recalled that the plunger 76 is secured, such as by welding, to the collar 70 so it is forced downwardly, striking the bight 162 of the foremost anchor 160 of the anchor supply 158. This action breaks the first anchor 160 loose from the others and the continued movement of the plunger 76 downwardly forces or drives the first anchor 160 into the ground which has been labeled 180.

In entering the ground, it will be appreciated that the legs 164 pass through some of the openings in the net 184 and between some of the strands of the underlying excelsior 186. FIG. 2 portrays the device 10 with the plunger 76 raised, and FIG. 5 depicts the plunger in its lowermost position, the collar 70 having struck the stop 74. It should be explained at this time that the location or mounting of the plunger 76 on the collar 70 and the location of the stop 74 are correlated so that the plunger 76 extends or projects downwardly through the slot 20, the lower end when in its lowermost position being somewhat beneath the bottom surface 16 of the sole plate 14. This ensures that the blanket 182 will be firmly held in place. Of course, the plunger 76 should not be thrust so far downwardly that it would sever any of the strands constituting the netting 184.

One nicety of my invention resides in the fact that where the soil or ground 180 is quite hard, then more downward force is needed in order to drive in a particular anchor 160. Since the worker 190 steps on the button 98 of the three-way valve to initiate the downward driving step, he can exert a sufficient pressure with his foot and his body weight so as to resist any tendency for the device 10 to move upwardly owing to the reactive forces created when the anchor 160 meets a compacted soil condition. This is a decided advantage because, while the worker 190 is grasping the handle unit 170, he need not push downwardly to any extent. He, instead, makes use of some of his body weight in preventing a reactive upward movement of the device 10 when inserting an anchor 160.

It will be appreciated that when the plunger 76 has moved downwardly to insert an anchor 160 into the ground 180, the plunger 76 provides automatic interference which prevents the next anchor 160 in the stack or supply 180 from being moved fowardly. However, as soon as the plunger 76 is retracted upwardly, as it will when the worker 190 removes his foot from the button 98, then the spiral spring 146 is instrumental in advancing the next anchor 160 into position so that when the button 98 is again stepped on, the next anchor 160 is driven into the ground.

It will be appreciated that the worker 190 selects the various locations where an anchor 160 will do the most good. Basically, where four foot width blanket strips are used, then the worker 190 will select spaced points or locations along the overlapped edges of the various strips of blanket material 182, selecting a central location between each four marginal locations. The point to be brought out at this stage is that the upwardly sloping flange 24 at the front of the shoe 12 enables the device 10 to be readily shifted, for the flange 24 acts much like a ski to permit the shoe 12 to be slid over the material 182. Of course, the worker can elevate to some extent the device 10 by raising the handle unit 170. It is just that the device 10, even though quite light in weight, does not have to be fully lifted in order to move it from spot to spot.

I claim:

1. A device for driving a U-shaped anchor into the ground comprising an elongated sole plate having a bottom surface adapted to engage the upper surface of sheet-like material at a site where the anchor is to be inserted, said sole plate having a transverse slot therein possessing a rectangular shape through which said anchor is to be driven, means on said sole plate for advancing said U-shaped anchor in a horizontal and longitudinally directed relation to said sole plate into registry with said transverse slot, actuating means on said sole plate including a plunger having a lower end corresponding generally to the rectangular shape of said slot for striking the closed end of said U-shaped anchor, guide means engaging said plunger to maintain the lower end thereof in an angularly oriented relationship with said transverse slot so as to cause the lower end of said plunger to drive said anchor downwardly through said slot, through said material and into the ground, and means for limiting the downward travel of said actuating means and hence the downward travel of said plunger so that the lower end of said plunger projects a distance slightly beneath the bottom surface of said sole plate when said plunger has completed its downward stroke.

2. A device in accordance with claim 1 in which said actuating means includes a vertical cylinder, a piston reciprocably disposed in said cylinder, and a piston rod extending downwardly from said piston through the lower end of said cylinder, said plunger being attached to the lower end of said piston rod.

3. A device in accordance with claim 2 in which said U-shaped anchor is inverted and the rectangular shape of said plunger is such as to engage the closed end of said U-shaped anchor when said plunger is urged downwardly by said piston rod while said plunger is maintained in its angularly oriented relationship with said transverse slot.

4. A device in accordance with claim 2 including a collar on said piston rod, said plunger being secured to the side of said collar toward said transverse slot, said guide means maintaining said collar in an angularly oriented relation via said plunger, and said limiting means including a stop on said sole plate for limiting the downward travel of said collar and hence the downward stroke of said plunger, the vertical location of said collar with respect to said stop being such that the plunger projects said distance beneath the bottom surface of said sole plate.

5. A device in accordance with claim 4 including an upright channel having an offset U-shaped central portion forming a vertical groove, and a sleeve secured in the upper end of said groove, said sleeve encircling said piston rod and serving as a bearing therefor.

6. A device in accordance with claim 4 including handle means extending generally horizontally from the upper end of said cylinder, said handle means including a pair of laterally spaced handle bars extending generally parallel to said elongated sole plate.

7. A device in accordance with claim 2 including valve means for supplying air to the upper end of said cylinder to cause said piston, said piston rod and said plunger to be forced downwardly.

8. A device for driving a U-shaped anchor into the ground comprising a sole plate having a bottom surface adapted to engage the upper surface of sheet-like material at a site where the anchor is to be inserted, said sole plate having a slot therein through which said anchor is to be driven, means on said sole plate for advancing said U-shaped anchor into registry with said slot, actuating means including a plunger having a lower end corresponding generally to the shape of said slot, a vertical cylinder, a piston reciprocably disposed in said cylinder, and a piston rod extending downwardly from said piston through the lower end of said cylinder, said plunger being attached to the lower end of said piston rod, means for limiting the downward travel of said actuating means and hence the downward travel of said plunger so that the lower end of said plunger is slightly beneath the bottom surface of said sole plate when said plunger has completed its downward stroke, and valve means mounted on said sole plate for supplying air to the upper end of said cylinder to cause said piston, said piston rod and said plunger to be forced downwardly, said valve means including a housing, a foot button, an inlet port, an outlet port and an exhaust port, said inlet port supplying air to the upper end of said cylinder when said foot button is depressed.

9. A device in accordance with claim 8 including means for advancing a supply of U-shaped anchors into successive juxtaposition beneath said plunger so that said plunger drives the foremost anchor into the ground and concurrently prevents the next anchor from moving into juxtaposition.

10. A device for driving U-shaped anchors into the ground comprising a shoe having a sole plate provided with a bottom surface adapted to confront the upper surface of sheet-like material at a site where the anchor is to be inserted into the ground, said sole plate having a generally rectangular transverse slot therein through which said U-shaped anchor is to be driven, an upright channel secured at its lower end to said shoe, said upright channel having an offset central portion forming a groove, a sleeve secured within said groove and attached to said offset U-shaped portion, an air cylinder extending upwardly from said sleeve, a piston reciprocably disposed in said cylinder, a piston rod extending downwardly from said piston and past said sleeve, said sleeve serving as a bearing for said piston rod, said cylinder having a plurality of exhaust ports adjacent its lower end, a coil spring contained in said cylinder for urging said piston and said piston rod upwardly, a foot operated air valve for connection to a supply of compressed air, said air valve having a foot-engageable button so that air flows through said valve when said button is depressed by a worker's foot, said valve having a connection with the upper end of said cylinder so that air admitted into the upper end of said cylinder will urge said piston and piston rod downwardly, a collar affixed to the lower end of said piston rod, a plunger in the form of a strip secured tangentially to said collar, the lower end of said strip having a generally rectangular cross section dimensioned so as to extend through said slot, guide means mounted on said upright channel, said guide means forming a vertical slot for constraining said strip so that it traverses a reciprocal, vertical path when said piston is moved downwardly by opening said valve and moved upwardly when said valve is closed, said spring biasing said piston upwardly, a stop on said shoe for limiting the downward movement of said collar and hence the downward travel of said strip, said strip being secured to said collar so that the lower end of said strip extends somewhat beneath the bottom surface of said sole plate when said collar engages said stop, a magazine for supplying U-shaped anchors horizontally into registry beneath said plunger when said strip is uppermost or retracted and said strip preventing the movement of the next U-shaped anchor when said strip is moving downwardly against the closed end of the U-shaped anchor that has been moved into registry beneath said strip, said supply means including a U-shaped pusher and a flat spiral spring for biasing said U-shaped pusher against said supply of anchors so as to intermittently advance said anchors so that the foremost anchor is in registry beneath said strip when said plunger is raised.

11. A device for driving a U-shaped anchor into the ground comprising a sole plate having a bottom surface adapted to engage the upper surface of sheet-like material at a site where the anchor is to be inserted, said sole plate having a rectangular slot therein and extending in a transverse direction thereacross through which said anchor is to be driven, means on said sole plate for advancing said U-shaped anchor horizontally across a portion of said sole plate into registry with said transverse slot, actuating means on said sole plate including a vertical cylinder, a piston reciprocably disposed in said cylinder, a piston rod extending downwardly from said piston through the lower end of said cylinder and a plunger having a lower end corresponding generally to the rectangular shape of said slot, valve means for supplying air to the upper end of said cylinder to cause said piston, said piston rod and said plunger to be forced downwardly, and means slidably engaging said plunger as it is forced downwardly to maintain said plunger in angular alignment with said transverse slot.

12. A device in accordance with claim 11 in which said valve means includes a housing, an inlet port, an outlet port, an exhaust port, and means for operating said valve means so that said inlet port supplies air to the upper end of said cylinder to cause said piston, said piston rod and said plunger to be forced downwardly.

* * * * *